MAGNETIC WRITE-READ TACHOMETER
Filed Jan. 7, 1964
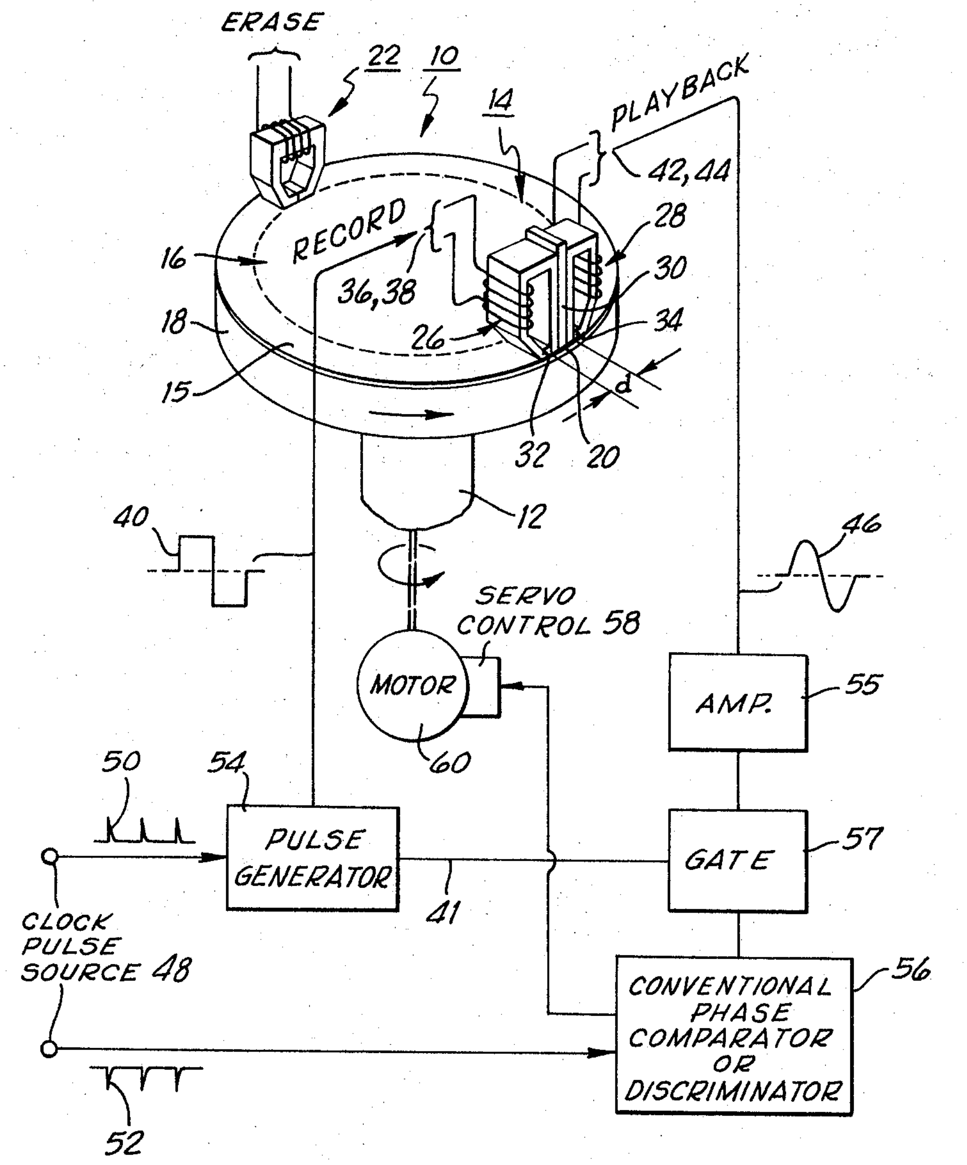
PAUL A. MAUCH
INVENTOR.
BY James H. Griffin
ATTORNEY 3,312,861
MAGNETIC WRITE-READ TACHOMETER Paul A. Mauch, Mountain View, Calif., assignor to Ampex Corporation, Redwood City, Calif., a corporation of California Filed Jan. 7, 1964, Ser. No. 336,269
4 Claims. (Cl. 317—5)

This invention relates to tachometers and more particularly to tachometers for use in servo systems requiring great accuracy of velocity information.

Until recent times, sensors for producing a signal related to the angular velocity of a rotating element almost always interacted with the rotating element through gears. Such geared tachometers are adequate for most aircraft engine and servo mechanism applications; but for the more sensitive measurements needed in such systems as magnetic tape recorders, the greatest accuracy achievable in the machining of gear teeth cannot begin to meet the necessary error restrictions. For example, the tolerances in the recording stage of a modern magnetic tape recorder are of the magnitude of one microsecond; in the playback stage, .2 microsecond error limits can be expected. Accordingly, transmitting mechanisms other than the geared type have been experimented with for precision tachometry.

One solution often tried is that of installing marking points on the rotating element in such a way that a photoelectric, magnetic, or other sensor in the tachometer can produce a signal based on the number of times the marking points pass by. Like geared teeth, however, such marking points cannot be positioned with a reasonable degree of accuracy, and the spaces between them will always be prohibitively non-uniform.

Of course, if only one marking point were used, an accurate measurement could be read off. The frequency of such a reading, though, would be too low to be useful; for example, the rotation to be measured in a magnetic tape recorder might be only 100 cycles per second, yet the frequency of measurement signal desired is 15 kc. Moreover, some forms of fast rotation exhibit elements of error that "wash out" and do not show up in a once-per-cycle measurement.

The deficiencies of all the above-mentioned methods of tachometry are even more troublesome wherever the rotation being measured has aberrant components such as eccentricity or wobble, for such aberrations alter the paths and signal times of the marking points without direct relation to any change of the rotary motion sought to be measured.

It is therefore a general object of this invention to provide an improved tachometer.

Another object of this invention is to provide a tachometer of greater sensitivity and accuracy than has heretofore been achieved.

Another object is to provide a tachometer that can make measurements and record error at a very high frequency.

Another object is to provide a tachometer the output of which is minimally affected by eccentricity or wobble.

In the achievement of the above objects, applicant's invention features the use of magnetic recording and playback onto a magnetic drum or some other device directly attached to rotate with the rotary element to be measured. A recording head and a playback head are located in the closest possible proximity to each other with the recording head leading the playback head vis-a-vis the direction of the rotation to be measured. Somewhere beyond the playback head is an erase head which removes all signals from the rotating magnetic material. In the operation of this system, a time pulse applied to the recording head is recorded on the rotating magnetic material and is immediately passed the very short distance to the playback head, which then produces an output signal to be fed into discriminator or phase comparator circuitry and thence to a servo motor of the rotary element being measured. Once it has passed the playback head, the signal pulse is no longer needed and is therefore removed by the erase head in order that it will not again produce a signal through the playback head.

Thus, applicant has eliminated the drawbacks and inadequacies of prior tachometers by using what may be called the "mark-read" principle, whereby a marking point is recorded, immediately read off, and then erased without any further use. Since the "mark-read" operation occupies but a small fraction of one cycle of the rotation being measured, many measurements per cycle are possible, and the influence of irregularities in the rotary motion or in the magnetic recording material is minimized. Best of all, of course, is the elimination of painstaking and expensive precision manufacturing in the placing of marking points, gear teeth, or the like.

Other objects and features of applicant's invention and a better understanding thereof may be had by referring to the following detailed description and the claims, taken in conjunction with the accompanying drawing in which the apparatus of one embodiment of applicant's invention is shown along with a block diagram of the supporting circuitry.

Referring to the drawing, applicant's invention provides a magnetic coated drum 10, which could also be a magnetic coated disk or a flat closed loop of tape. The drum 10 is mounted to rotate with a shaft 12, the rotation of which is desired to be measured. The rotation of the shaft 12 and the drum 10 is shown as counterclockwise for the purpose of illustration.

A record-playback or mark-read unit 14 is shown in position for marking and reading off pulses at the outer periphery 15 (selected in this embodiment as the recording surface) of the flat upper surface 16 of the drum. Alternatively, such a unit could be placed to mark and read on the flat under-surface of the drum or on the cylindrical portion 18, although in this latter case it would be necessary to manufacture the recording face 20 of the unit 14 with a curvature conforming closely to the curvature of the cylindrical portion 18. This, of course, requires precision machining and adds problems of accuracy and expense.

A conventional magnetic erase head 22 is positioned behind (relative to the rotation of the drum) the mark-read unit 14. It is thus able to erase the recording surface 15 before re-use by the mark-read unit.

The mark-read unit 14 is composed of a record side 26 and a playback side 28 separated by a shield 30, which cuts down the exchange of magnetic flux between the sides 26, 28. Each side has its own gap 32, 34, separated by a distance, *d*. Best results are obtained by keeping distance, *d*, shorter than the maximum wave length to be resolved. Input leads 36, 38 to the recording side 26 carry a signal 40 to be marked on the drum 10 to a conventional record head (not shown) on the recording side 26. Similarly, the output leads 42, 44 carry the signal 46 from a conventional playback head (not shown) on the playback side 28 of the mark-read unit 14.

The above-described apparatus embodying applicant's invention has supporting circuitry including a source 48 of clock pulses 50, 52. The clock pulses 50 are fed into a pulse generator 54 which applies the input pulses 40 across the input leads 36, 38. In like manner, an amplifier 55, a gate 57, and a conventional phase comparator or discriminator circuit 56 take the output signal 46 from the output leads 42, 44. The circuit 56 is coupled to a servo control 58 which controls the motor 60 producing the rotation being measured. Whether the circuit 56 is a phase comparator or a discriminator usually depends on whether its signal to the servo control 58 is to be used for phase-locking of the servomotor 60 or for mere dampening or degenerative feedback of the signal thereto.

Although in the usual practice of applicant's invention the gaps 32, 34 will be parallel along the recording face 20, it should not be forgotten that such parallel positioning builds a slight element of error into the tachometer since the mark recorded by the gap 32 will rotate through a few degrees before crossing the distance, *d*, to the playback gap 34, and thus the outer end of the mark will reach the playback gap 34 before the inner end of the mark. To completely eliminate the resulting playback inaccuracy and noise, the gaps 32, 34 may be placed parallel to radii of the upper surface 16 or closer together; or the diameter of the drum 10 may be enlarged.

In the operation of the above-described tachometer, the shaft 12 is rotated by the motor 60. The drum 10 rotates with the shaft 12, at the same angular velocity. During this rotation, the clock pulse source 48 supplies pulses 50 to the pulse generator 54, which applies the waveform 40 across the input leads 36, 38 of the record side 26 of the mark-read unit 14. The frequency of the waveform 40 should allow time for each recorded pulse to be read before its immediate successor is marked; for the gate 57 and processing circuitry 56 would otherwise have to be very sensitive to separate any input side-output side crosstalk signals from the mark-read signals. The waveform 40 magnetizes the conventional record head (not shown) of the record side 26, so that the magnetic flux through the gap 32 causes a mark to be recorded on the periphery of magnetic coated drum 10.

The drum 10 being in rotation, the recorded mark travels the distance, *d*, to the gap 34 of the playback side 28. Since the recorded mark constitutes a change in the magnetic field crossing the gap 34, a change in the induced magnetic field of the conventional playback head (not shown) occurs and, thus, a current flow in the winding thereof results in the appearance of output waveform 46 at the output leads 42, 44.

The output waveform 46 is first amplified at 55 and then passes through the gate 57, when opened by signals from the pulse generator 54 along leads 41. The purpose of the gate 57 is to block unwanted signals, especially those produced by crosstalk between the input leads 36, 38 and the output leads 42, 44 and between the record side 26 and the playback side 28. Thus, the signals from the pulse generator 54, provided along leads 41, should be such as to close the gate 57 at the moment that the gap 32 is recording the mark and then to open the gate 57 in time to pass the output waveform 46 appearing across the gap 34.

Once the output waveform 46 has passed through the amplifier 55 and the gate 57, it can be processed by any one of a variety of circuits, here represented at 56, of the type that process tachometer output signals to create an input or a feedback signal for the servo-control circuits 58 of the motor 60. If the circuit 56 is a phase discriminator and is to supply an input signal for the motor 60, to phase-lock the motor revolutions to a certain timed signal, the clock pulses 52 will be necessary to provide a time phase reference. If the circuit 56 need only supply a feedback or damping signal to the servo-control 58, the clock pulses 52 are not needed. In either case, the output of the circuit 56, a reconstituted form of the waveform 46, is fed to the conventional servo-control circuitry 58, which is an integral part of the motor 60.

It will be seen from the foregoing description and from the figure that applicant's invention provides a new concept in tachometry, making possible extreme accuracy in measurement, high frequency of sampling, and minimum distortion due to the eccentricity or wobble of the rotating element from which the measurements are being taken. While the invention has been described with specific reference to a preferred embodiment wherein the marking and reading are done on the magnetized top of a rotating drum, it should be understood that other arrangements are possible without departing from the spirit and principle of applicant's invention.

What is claimed is:

1. A system for developing an output signal based upon the motion of a rotating object comprising a magnetic recording element mounted to rotate with said rotating object, a magnetic recording head and a magnetic playback head mounted adjacent said recording element to operate thereon during rotation thereof with said rotating object, said playback head closely displaced from said recording head in the direction of rotation of said recording element, an erase head mounted adjacent said recording element at a position displaced from said playback head in the direction of rotation of said recording element, an input signal source coupled to said recording head to apply single cycles of an input waveform thereto with constant time intervals therebetween, each of said single cycles having a period less than the time required for a given point of said recording element to rotate between said recording and playback head, and output circuitry coupled to said playback head to process waveforms reproduced therefrom into an output signal based upon the motion of said rotating object, said output circuitry including a gate coupled to said playback head and having a gating input coupled to said input signal source, said gate timed to close upon initiation of each cycle of said input waveform and open at a time between the termination of said cycle and the time a point of said recording element adjacent said recording head at the initiation of said cycle has rotated adjacent said playback head to thereby block crosstalk signals between the recording head and playback head.

2. A system for developing an output signal based upon the motion of a rotating object comprising a magnetic recording element mounted to rotate with said rotating object, magnetic recording, playback, and erase heads mounted adjacent said recording element to operate thereon in sequence during rotation of the recording element with said rotating object, said playback head closely displaced from said recording head in the direction of rotation of said recording element, a source of clock pulses, a pulse generator coupled to said source, said pulse generator having a first output for generating one cycle of a square waveform in response to each of said clock pulses, each cycle having a period less than the time required for a given point of said recording element to rotate between said recording and playback heads, said pulse generator having a second output for generating a gate pulse in response to each of said clock pulses, each gate pulse having a duration slightly greater than the period of each cycle of said square waveform, means connecting said first output of said pulse generator to said recording head, and a gate coupled to said playback head and having a gating input connected to said second output of said pulse generator, said gate being gated closed by said gate pulses.

3. A system according to claim 2 further defined by said recording and playback heads including magnetic cores respectively having recording and playback gaps therein, said cores mounted with the respective gaps thereof in close proximity, and a magnetic shield interposed between said cores.

4. A system for controlling the speed of a rotating object rotated by a servomotor comprising a magnetic recording element mounted to rotate with said rotating object, a magnetic recording head including a magnetic core having a recording gap and windings on said core, a magnetic playback head including a magnetic core having a playback gap and windings on said core, said recording and playback heads mounted with the gaps thereof in close proximity adjacent said recording element, a magnetic shield interposed between the cores of said heads, a magnetic erase head mounted adjacent said recording element at a position displaced from said record and playback heads in the direction of rotation of said recording element, a source of clock pulses, a pulse generator coupled to said source, said pulse generator having a first output for generating one cycle of a square waveform in response to each of said clock pulses with the period of said cycle being less than the time required for a given point of said recording element to rotate between said gaps of said recording and playback heads, said pulse generator having a second output for generating a gate pulse in response to each of said clock pulses with the duration of said gate pulse being slightly greater than said period of said cycle, means connecting said first output of said pulse generator to said windings of said recording head, a gate coupled to said windings of said playback head and having a gating input coupled to said second output of said pulse generator, said gate being gated closed by said gate pulses, a phase comparator having inputs coupled to the output of said gate and to said source of clock pulses for developing an output error signal proportional to phase differences therebetween, and servo control means coupled to the output of said phase comparator and arranged to control the speed of said servomotor in accordance with said error signal.

References Cited by the Examiner

UNITED STATES PATENTS

| | | | |
|---|---|---|---|
| 2,786,978 | 3/1957 | Warner | 324—706 |
| 3,205,437 | 9/1965 | Camp | 324—706 |

WALTER L. CARLSON, *Primary Examiner.*

M. J. LYNCH, *Assistant Examiner.*